Patented Oct. 11, 1949

2,484,425

UNITED STATES PATENT OFFICE 2,484,425

TREATMENT OF SYNTHETIC RUBBER LATICES

John S. Rumbold, Woodbridge, Conn., assignor to United States Rubber Company, New York, N. Y., a corporation of New Jersey No Drawing. Application October 3, 1945, Serial No. 620,170

4 Claims. (Cl. 260—85.1)

1

This invention relates to the treatment of synthetic rubber latices, and more particularly to a method of increasing the average particle size of synthetic rubber latices without the addition of salts thereto, and to improvements in the creaming of synthetic rubber latices.

Synthetic rubber latices, as is known, may be prepared by the emulsion polymerization in an aqueous medium of butadienes-1,3 or mixtures of butadienes-1,3 with other polymerizable compounds capable of forming copolymers with butadienes-1,3. Such aqueous emulsion polymerizates, or synthetic rubber latices, may be creamed by the addition of a hydrophilic colloidal creaming agent, such as is used for creaming natural rubber latex, which will cause the dispersion on standing to separate into a polymer-rich fraction and a polymer-poor fraction, which fractions may be separated from each other by simple mechanical means, such as decantation, drawing-off, and the like.

In increasing the average particle size of a synthetic rubber latex according to the present invention, acetone is added to the synthetic rubber latex and then physically removed from the latex. This has been found to materially increase the average particle size of the latex. Due to the coagulative effect of anhydrous acetone on synthetic rubber latices, the acetone should preferably be added in the form of an acetone-water solution containing at least 15% by weight of water. For maximum increase in the average particle size of the latex, the water content of the acetone-water solution added to the latex should preferably not be more than 35% by weight. The amount of acetone added is preferably from 35 to 50 parts by weight per 100 parts by weight of the aqueous phase of the latex after the addition of the acetone. The acetone is preferably added in the form of a 65 to 85% by weight aqueous solution of acetone as above described. After addition, the acetone may be readily removed, as by blowing steam through the latex. The acetone need not be entirely removed from the latex, but it is desirable to remove as much as conveniently possible when the latex is to be creamed since the acetone has a decided gelling effect on mucilagenous creaming agents. The thus treated latex may be creamed with a hydrophilic colloidal creaming agent to a higher cream solids content than the untreated latex. The hydrophilic colloidal creaming agent may be one of the conventional vegetable mucilages used in the creaming of natural latex, for example, alkali-metal or ammonium alginate,

2 locust seed or carob bean gum, pectates, Karaya gum, Irish moss, and the like. These vegetable mucilages may be used in amounts between .05 to 1% based on the water phase of the synthetic rubber latex, similarly to the creaming of natural latex.

In the preparation of the synthetic rubber latex, as is known, polymerizable monomeric compounds are emulsified in an aqueous medium by means of an emulsifying agent, such as a soap or other surface active agent, and the polymerization is made to take place generally at elevated temperatures in the presence of a catalyst and other regulating materials. Examples of such polymerizable material are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3. The polymerizable material as known may be a mixture of such butadienes-1,3 with other polymerizable compounds which are capable of forming rubbery copolymers with butadienes-1,3, for example, up to 70% of such mixture of a compound which contains a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether, methyl vinyl ketone; vinylidene chloride. Present day commercial synthetic rubbers of the above types are polymerized chloro-2-butadiene-1,3, known as neoprene or GRM rubber, copolymers of butadiene-1,3 and styrene, known as Buna S or GRS rubber, and copolymers of butadiene-1,3 and acrylonitrile, known as Buna N or GRN rubber.

The following examples are illustrative of the present invention, all parts recited therein being by weight.

Example I

A 35% Buna S latex was prepared by polymerizing an aqueous emulsion of equal parts by weight of butadiene-1,3 and styrene with 5% potassium abietate and 1% of the sodium salts of short chain alkyl naphthalene sulfonic acids ("Daxad No. 11") as emulsifying agents.

To 100 parts of the latex was added a solution of 65 parts of acetone in 22 parts of water. Steam was then blown through the latex to drive off the acetone, which was completely removed in this way without difficulty. After steaming, the total amount of acetone-free latex was 180 parts by weight, and its total solids content was 19.0%. The average particle size of the latex was determined by the conventional light scattering method with a Photo-Volt Lumetron colorimeter measuring the intensity of the light scattered at an average angle of 90° to the incident beam. The average particle diameter of the treated latex was 0.17 micron as compared to an average particle diameter of the original untreated latex of 0.09 micron.

The latex treated with acetone and steamed as above was creamed one day with 0.1% ammonium alginate based on the water content from an 18% solids concentration and gave a 47% solids content cream, whereas the untreated latex creamed one day from a 34% concentration gave only a 42% solids content cream.

*Example II*

To 100 parts of the latex of Example I was added 75 parts of acetone in 25 parts of water. The acetone was blown out with steam, and some of the condensed steam was distilled off under reduced pressure, giving a 26% solids latex having an average particle diameter as measured by the light scattering method of 0.19 micron.

To 150 parts of the thus treated latex was added 35 parts of the original latex and the mixture was creamed from 27% solids concentration with 0.06 parts of ammonium alginate based on the water phase. After four days, the solids concentration of the cream was 62%, whereas the solids concentration of the original latex creamed from 33% concentration was 41% solids content after four days creaming.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of treating a synthetic rubber latex comprising an aqueous emulsion polymerizate of a mixture of butadiene-1,3 with a compound which contains a single $CH_2=C<$ group where at least one of the disconnected valences is attached to a group which increases the polar character of the molecule and which compound is copolymerizable with butadiene-1,3 to increase the average particle size of said synthetic rubber latex which comprises adding to the synthetic rubber latex a 65 to 85% by weight aqueous solution of acetone in amount from 35 to 50 parts by weight of acetone per 100 parts by weight of the aqueous phase of the latex after the acetone addition, and thereafter removing added acetone from said synthetic rubber latex by distillation therefrom.

2. The method of treating a synthetic rubber latex comprising an aqueous emulsion polymerizate of a mixture of butadiene-1,3 and styrene to increase the average particle size of said synthetic rubber latex which comprises adding to the synthetic rubber latex a 65 to 85% by weight aqueous solution of acetone in amount from 35 to 50 parts by weight of acetone per 100 parts by weight of the aqueous phase of the latex after the acetone addition, and thereafter removing added acetone from said synthetic rubber latex by distillation therefrom.

3. The improvement in the creaming with a hydrophilic colloidal creaming agent of a synthetic rubber latex comprising an aqueous emulsion polymerizate of a mixture of butadiene-1,3 with a compound which contains a single $CH_2=C<$ group where at least one of the disconnected valences is attached to a group which increases the polar character of the molecule and which compound is copolymerizable with butadiene-1,3 which comprises adding to the synthetic rubber latex a 65 to 85% by weight aqueous solution of acetone in amount from 35 to 50 parts by weight of acetone per 100 parts by weight of the aqueous phase of the latex after the acetone addition, removing added acetone from said synthetic rubber latex by distillation therefrom, and creaming the thus treated synthetic rubber latex with a vegetable mucilage.

4. The improvement in the creaming with a hydrophilic colloidal creaming agent of a synthetic rubber latex comprising an aqueous emulsion polymerizate of a mixture of butadiene-1,3 and styrene which comprises adding to the synthetic rubber latex a 65 to 85% by weight aqueous solution of acetone in amount from 35 to 50 parts by weight of acetone per 100 parts by weight of the aqueous phase of the latex after the acetone addition, removing added acetone from said synthetic rubber latex by distillation therefrom, and creaming the thus treated synthetic rubber latex with a hydrophilic colloidal creaming agent.

JOHN S. RUMBOLD.

REFERENCES CITED

The following references are of record in the file of this patent:

UNITED STATES PATENTS

| Number | Name | Date |
| --- | --- | --- |
| 2,161,949 | Calcott et al. | June 13, 1939 |
| 2,264,191 | Starkweather et al. | Nov. 25, 1941 |
| 2,357,861 | Willson | Sept. 12, 1944 |
| 2,405,724 | Wilder | Aug. 13, 1946 |

OTHER REFERENCES

Barron, "Modern Synthetic Rubbers," 2d ed., Van Nostrand Co., N. Y. (1944), pages 160–161.